United States Patent [19]
Piper

[11] 4,284,377
[45] Aug. 18, 1981

[54] PORTABLE KEY SEAT CUTTER

[75] Inventor: Bert W. Piper, 36051 Goddard Rd., Romulus, Mich. 48174

[73] Assignee: Bert William Piper, Belleville, Mich.

[21] Appl. No.: 78,641

[22] Filed: Sep. 24, 1979

[51] Int. Cl.³ .............................................. B23D 37/04
[52] U.S. Cl. ..................................... 409/259; 409/296; 409/307
[58] Field of Search ................ 409/259, 296, 307, 304

[56] References Cited

U.S. PATENT DOCUMENTS

| 10,873 | 5/1854 | Williams | 409/307 |
|---|---|---|---|
| 131,293 | 9/1872 | Mooney | 409/304 |
| 335,333 | 2/1886 | Benson | 409/307 |
| 390,306 | 10/1888 | Morton | 409/307 |
| 685,772 | 11/1901 | LaPointe | 409/259 |
| 722,222 | 3/1903 | Fuhrman | 409/296 |
| 870,971 | 11/1907 | Lindstrom | 409/307 |
| 958,081 | 5/1910 | Billing | 409/307 |
| 1,120,652 | 12/1914 | Rau | 409/307 |
| 1,465,460 | 8/1923 | Alleman | 409/332 |
| 2,180,477 | 11/1939 | Morton | 409/307 |
| 2,263,870 | 11/1941 | Currie | 409/296 |
| 2,909,967 | 10/1959 | Ranous | 409/307 |
| 3,499,366 | 3/1970 | Spain | 409/259 |

FOREIGN PATENT DOCUMENTS 2741918  3/1979  Fed. Rep. of Germany ........... 409/259

Primary Examiner—William R. Briggs
Attorney, Agent, or Firm—Barnes, Kisselle, Raisch & Choate

[57] ABSTRACT

The key seat slotter has a shank on which a pulley is adapted to be clamped. A broaching blade is slidable in a groove on the shank through the bore of the pulley. The key seat is cut in the pulley bore by manually pivoting a handle to effect repeated strokes of the broaching blade. The depth of the cut is progressively increased to the desired depth of the slot between successive strokes of the blade by incremental advancement of a tapered feed bar in the groove on the shank on which the broaching blade is slidably mounted.

5 Claims, 7 Drawing Figures

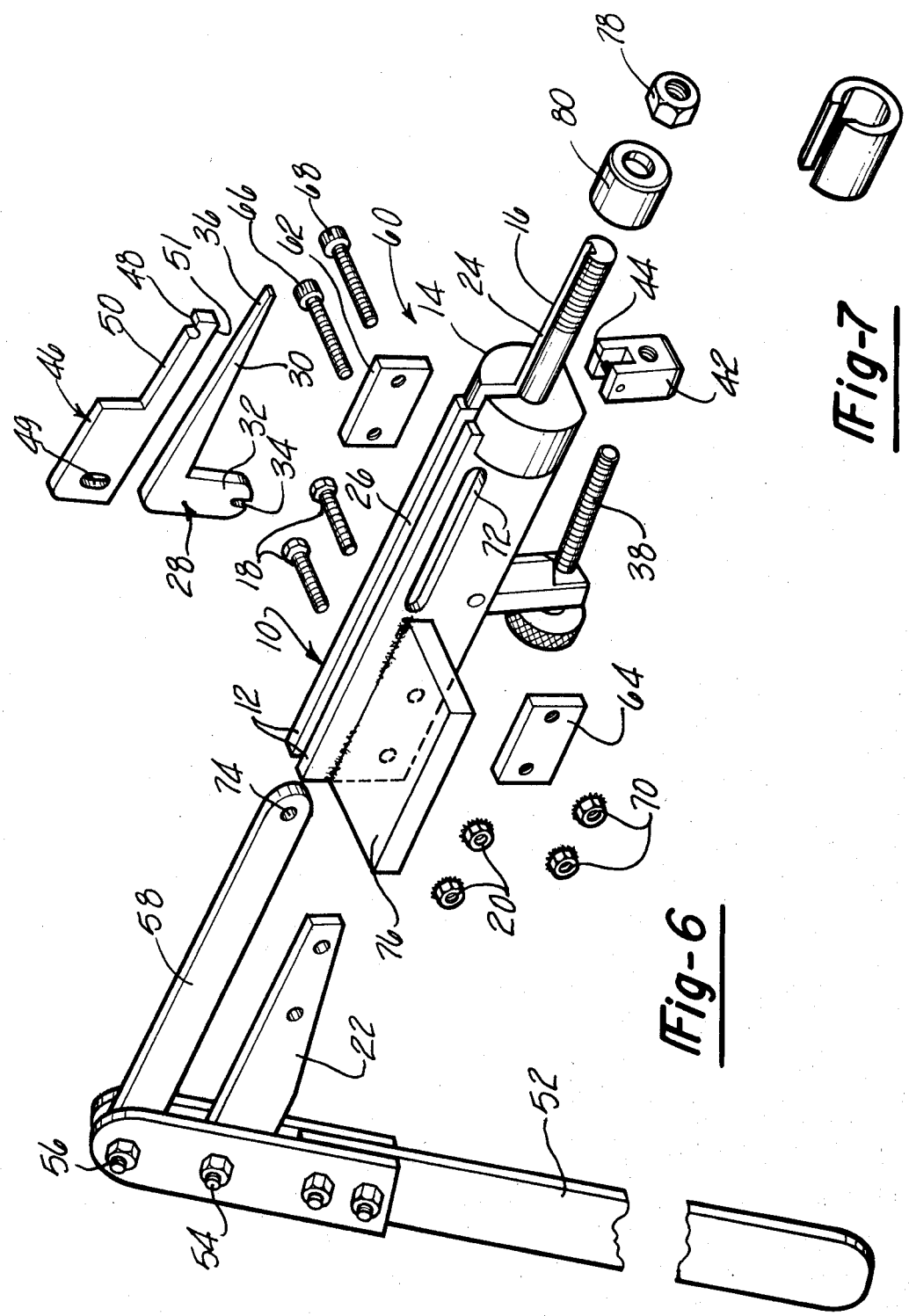

PORTABLE KEY SEAT CUTTER

This invention relates to a portable key seat cutter for pulleys and the like.

Machine pulleys are sometimes formed with a continuously circular through bore and are secured to a shaft by tightening one or more adjustable set screws intersecting the bore. However, some shafts are formed with axially extending keyway slots and the pulleys intended for use on such shafts must likewise be provided with an axially extending keyway seat so that the pulley can be locked to the shaft by means of a conventional key. It frequently happens that the existing key seat on a pulley becomes worn or damaged and another key seat must be formed in the bore of a pulley. Therefore, the need frequently arises to form a key seat in a pulley bore. Such key seats are normally cut on conventional broaching machines but such machines are not normally readily available in small repair shops and the like where the need for forming such key seats frequently arises.

The primary object of this invention is to avoid the necessity of utilizing a conventional broaching machine to cut a key seat in the bore of a pulley or the like.

A more specific object of the present invention is to provide a portable, manually operable key seat cutter of economical design which enables the user to quickly and in a simple manner cut a key seat in a bore of a pulley or the like.

Other objects, features and advantages of the present invention will become more apparent from the following description and accompanying drawings, in which:

FIG. 6 is an exploded perspective view of the cutter;

FIG. 7 is a perspective view of an adaptor bushing usable with the tool.

Figure 1:
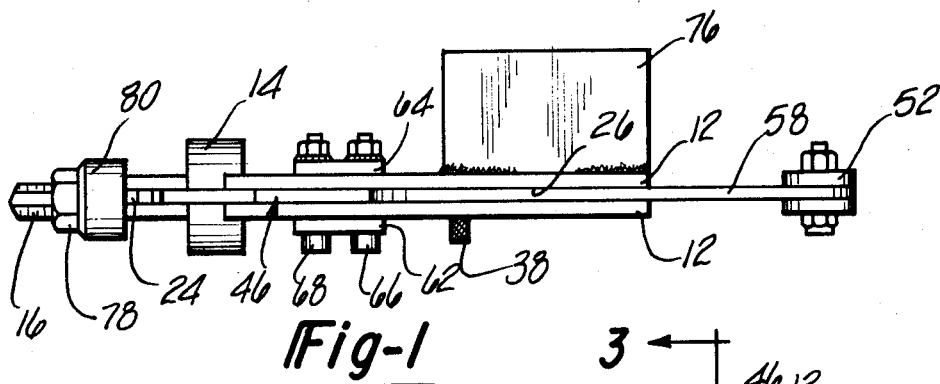
FIG. 1 is a top plan view of a key seat cutter according to the present invention.
Figure 2:
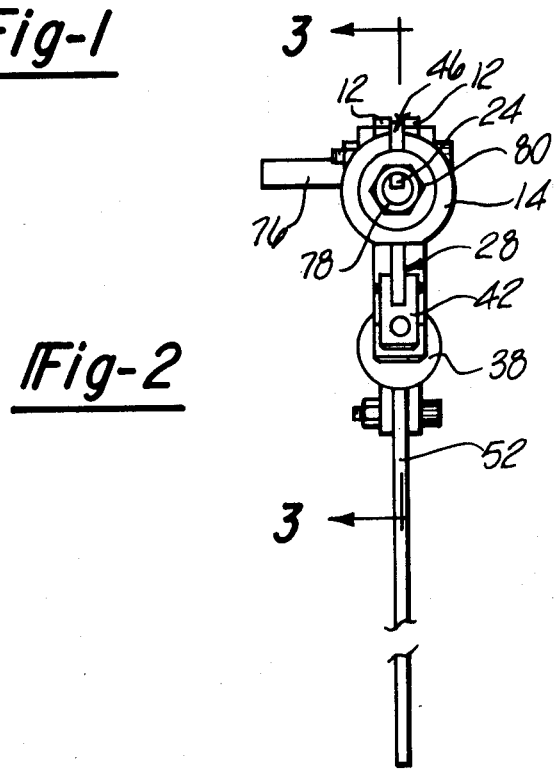
FIG. 2 is a front elevational view of the key seat cutter.
Figure 3:
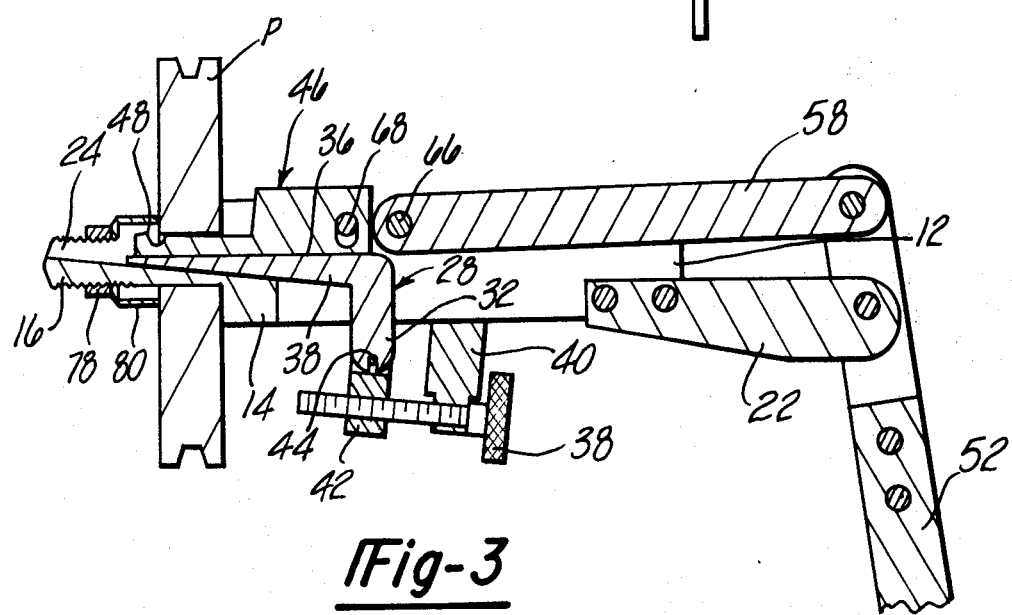
FIG. 3 is a sectional view along the line 3—3 of FIG. 2 and showing a pulley clamped on the cutter with the broaching blade in its forwardmost position.
Figure 4:
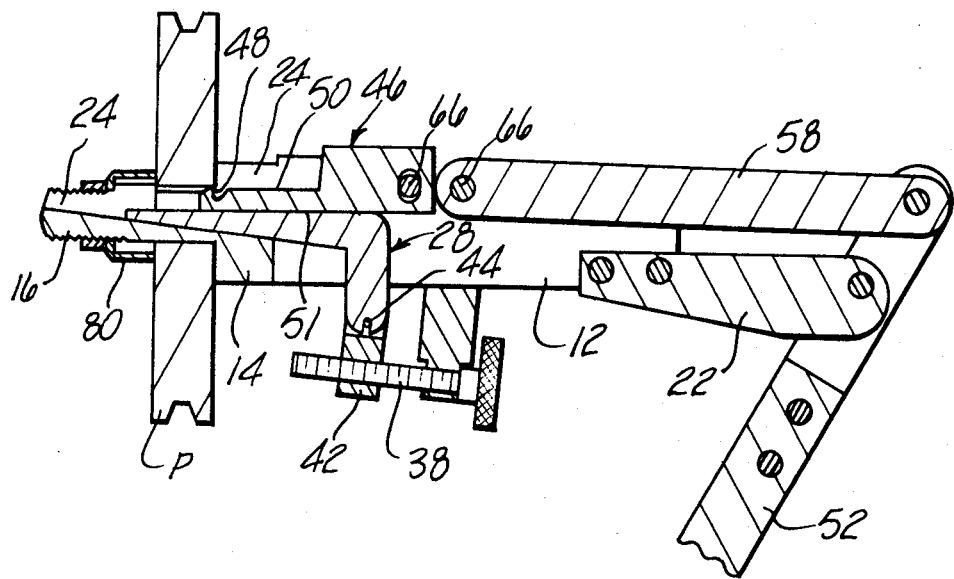
FIG. 4 is a view similar to FIG. 3 and showing the broaching blade retracted through the bore of the pulley after having made a cut.
Figure 5:
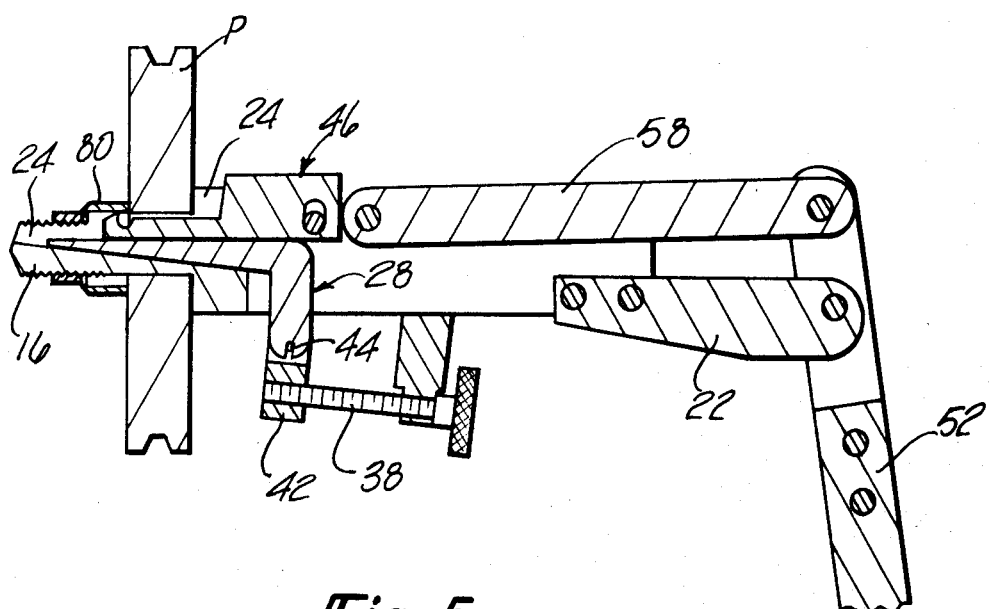
FIG. 5 is a view similar to FIG. 3 and showing the broaching blade advanced radially outwardly to increase the depth of the cut.

Referring to FIGS. 1, 2 and 6, the cutter of the present invention comprises a shank 10 formed of two flat plates which are spaced laterally apart in parallel relation and welded at their forward ends to a nosepiece 14. An axially projecting threaded shaft 16 is formed integrally with the nosepiece 14. Adjacent the rear ends thereof plates 12 are securely clamped in spaced relation by screws 18 and nuts 20 to a rearwardly extending bracket 22 which is positioned between the plates. Plates 12 are maintained in the spaced parallel relation by bracket 22 and the weld connection between the forward ends of the plates and nosepiece 14. Nosepiece 14 and shaft 16 are provided with a longitudinal slot 24, the bottom face of which is inclined upwardly in a forward direction at an acute angle to the axis of the shaft. This inclination of the bottom wall of slot 24 is preferably on the order of about five degrees. Slot 24 is aligned with the slot 26 between the two parallel spaced plates 12 and the width of slot 24 corresponds generally with the width of slot 26.

A feed bar 28 in slots 24, 26 has a forwardly extending wedge portion 30 and a laterally extending finger 32 notched at its lower end as at 34. The wedge portion 30 of feed bar 28 is seated on the bottom face of slot 24 and when so seated in slot 24 the top face 36 of the wedge bar is parallel to the axis of shaft 16. Finger 32 of feed bar 28 projects downwardly through slot 26. Feed bar 28 is adapted to be shifted axially within groove 24 by a thumb screw 38 journalled in a bracket 40 secured to the lower portion of bars 12 and threaded through a nut 42 having a pin 44 thereon engaged in notch 34.

A broaching blade 46 is slidably arranged on the top face 36 of feed bar 28. The forward end of blade 26 is formed with a broach cutting edge 48. The rear end portion of blade 26 is formed with a vertically elongated opening 49. The straight top and bottom edges 50, 51 of the shank of the blade are preferably parallel and the cutting edge 48 extends upwardly beyond the upper edge 50 a slight extent, for example, about 0.0005".

The means for reciprocating blade 46 comprises a handle 52 pivotally mounted as at 54 to the rear end of bracket 22. The upper end of handle 52 is pivotally connected as at 56 to the rear end of a link 58. Link 58 extends forwardly in the slot or guideway 26 defined by the spaced plates 12. The forward end of link 58 is pivotally connected to the rear end of blade 46 by a slide block assembly 60 which comprises two small rectangular plates 62, 64 slidably arranged one against each of the outer sides of the two plates 12. The two plates are interconnected by screws 66, 68 and nuts 70, the two screws 66, 68 extending through registering horizontally elongated slots 72 in the two side plates 12. Screws 66 extend through an opening 74 at the forward end of link 58 and forms a pivot connection therewith. Screw 68 extends through the vertically elongated opening 49 in blade 46. To enable the tool to be rigidly held in a vise, one of the plates 12 has a bracket 76 welded thereon and extending therefrom in a plane perpendicular to the plane of plate 12.

In use the tool is preferably supported on a workbench by clamping the bracket 76 between the jaws of a bench vise. Thumb screw 38 is rotated to position the feed bar 28 in the retracted position wherein the finger 32 is located adjacent bracket 40. Thereafter a pulley P is telescoped over shaft 16 so that its rear face shuts against the front face of nosepiece 14. The pulley is then clamped in this position by means of a nut 78 threaded on shaft 16. A cup-shaped bushing 80 is interposed between nut 78 and the front face of the pulley. In the arrangement illustrated the pulley P has a bore the diameter of which corresponds to the diameter of shaft 16. If the pulley bore diameter is greater than the diameter of shaft 16 then a radially slotted adapter bushing 82 to accommodate this difference in diameter would be slipped over shaft 24 with the slot therein aligned radially with slot 24. After the pulley is clamped on the tool, with or without an adapter bushing, handle 52 is pivoted in a direction to advance the broaching blade 46 in slot 24 through the pulley bore to a position wherein the cutting edge 48 is located within the cup-shaped bushing 80. Thumb screw 38 is then rotated to advance the feed bar 28 forwardly and thus displace the broaching blade 46 radially outwardly to a position wherein the cutting edge 48 is located radially outwardly at least slightly beyond the bore diameter. The top edge 50 of the blade shank limits the maximum depth of cut for each stroke of the blade. Handle 52 is then pivoted to retract the blade through the pulley bore and thus cut a shallow groove at the desired location of the key seat. After the blade is again advanced to locate the cutting edge 48 within the sup-shaped bushing 80, the feed bar is again advanced slightly in groove 24 and the cutting action is repeated. This operation is repeated until a key seat of the desired depth is cut in the bore of a pulley. Adapter bushings 82 and cup-shaped bushings 80 of varying sizes are utilized to accomodate pulleys having bores of different diameters to enable use of the same tool with a wide range of pulley sizes.

I claim:

1. A key seat cutter for pulleys and the like comprising an elongated shank comprising a pair of flat plates spaced apart in parallel relation so that the opposed spaced apart faces form a guideway therebetween and a nose piece integrally connected to the forward ends of said plates, said nose piece comprising an enlarged boss having a flat front face and a threaded shaft projecting forwardly therefrom, said shaft being adapted to receive the bore of a pulley in which the key slot is to be cut, said nose piece having an axially extending slot therein which forms an axial extension of said guideway, said slot extending through said boss and said shaft in radial alignment with said guideway and having a straight, axially extending, bottom wall inclined at a small angle to the axis of the shaft, a feed bar in the form of an elongated wedge slideably arranged in said guideway and having a forward end portion seated on said inclined bottom face of said slot, said feed bar having an arm at its rear end extending laterally outwardly from the guideway, the top face of said feed bar extending parallel to the axis of said shaft, a thumb screw rotatably supported on said shank and in threaded engagement with the end of said arm for shifting said feed bar axially in said guideway, a broaching blade slideably arranged in said guideway and seated on the top face of said feed bar, a handle pivotally supported on said shank adjacent the rear end thereof, a link in said guideway having its rear end pivotally connected with said handle and having its forward end connected with said broaching blade so as to reciprocate the broaching blade when the handle is pivotally actuated, said broaching blade having a rearwardly facing cutting edge thereon adjacent the forward end thereof adapted to be reciprocated in said slot through the bore of a pulley supported on said shaft to cut a key slot therein when the handle is pivotally actuated, a nut threaded on the forward end of said shaft and a bushing on said shaft interposed between said nut and said boss, said bushing being adapted to bear against the front face of a pulley on said shaft to clamp the pulley against the front face of said boss when the nut is tightened, said bushing having a recess therein for accommodating the forward end of said broaching blade when the handle is actuated to shift the blade forwardly in said slot to a position wherein said cutting edge is disposed forwardly of said pulley.

2. A key seat cutter as called for in claim 1 wherein said shank has a flat plate bracket fixedly mounted thereon, said bracket being adapted to be gripped between the jaws of a bench-mounted vise to clamp the tool in a fixed stable position.

3. A key seat cutter as called for in claim 1 wherein said plates each have a slot therein extending lengthwise thereof, the slot in one plate registering laterally with the slot in the other plate and including plate means extending transversely through said slots, interconnecting said link and blade and guided by said slots for reciprocation axially of said shank.

4. A key seat cutter as called for in claim 1 wherein said bushing is cup-shaped and has its open end facing rearwardly to engage the front face of the pulley when the nut is tightened.

5. A key seat cutter as called for in claim 1 wherein the diameter of the shaft is smaller than the diameter of the pulley bore and including a cylindrical bushing on said shaft having an outer diameter corresponding to the pulley bore diameter, said cylindrical bushing having a radially extending slot therethrough aligned axially with the slot in said shaft to permit reciprocation of said blade through the pulley bore.

* * * * *